United States Patent [19]

Takada

[11] Patent Number: 5,521,791

[45] Date of Patent: May 28, 1996

[54] THREE-TERMINAL DIP TYPE CAPACITOR

[75] Inventor: Keiji Takada, Tokyo, Japan

[73] Assignee: NEC Corporation, Tokyo, Japan

[21] Appl. No.: 334,302

[22] Filed: Nov. 4, 1994

[30] Foreign Application Priority Data

Nov. 4, 1993 [JP] Japan ................................. 5-275336

[51] Int. Cl.⁶ ....................................................... H01G 4/228
[52] U.S. Cl. ........................... 361/538; 361/539; 361/540
[58] Field of Search ..................................... 361/538–540, 361/523, 528, 532, 533, 535; 29/25.03

[56] References Cited

U.S. PATENT DOCUMENTS

| 4,068,291 | 1/1978 | Pierpont | 361/533 |
| 4,162,518 | 7/1979 | Curlis, Jr. | 361/528 |

FOREIGN PATENT DOCUMENTS

| 5055095 | 3/1993 | Japan | 29/25.03 |

Primary Examiner—Bot L. Ledynh
Attorney, Agent, or Firm—Sughrue, Mion, Zinn, Macpeak & Seas

[57] ABSTRACT

Respective arc-shaped portions of two cathode lead terminals are arranged in opposition across a capacitor element to surround the side periphery of the capacitor element. These arc-shaped portions have straight portions at respective one open ends, which straight portion extends in axial direction of the capacitor element, namely in a direction along which an anode lead terminal provided on the end face of the capacitor element extends. The straight portions of the cathode lead terminals also arranged in opposition across the capacitor element. Accordingly, two straight portions of the cathode lead terminals are aligned across the anode lead terminal. By this, a three-terminal dip type capacitor which can achieve high reliability of connection between the cathode lead terminals and the capacitor element and reduction of production cost.

6 Claims, 6 Drawing Sheets

THREE-TERMINAL DIP TYPE CAPACITOR

BACKGROUND OF THE INVENTION

1. Field of the Invention

The present invention relates to a three-terminal dip type capacitor.

2. Description of the Related Art

In general, a three-terminal dip type capacitor (hereinafter referred to as "three terminal capacitor") has three lead terminals 1, 2aL and 2aR extending from an armor resin 6 in alignment as shown in FIG. 12. Among these three terminals, the outer two lead terminals 2aR and 2aL are commonly connected to one of charge accumulating opposing electrodes of a capacitor element within the armor resin 6, and thus are constructed to have equal potential to each other. The central terminal 1 is connected to the other of the opposing electrodes with respect to the outer two terminals 2aR and 2aL. Accordingly, between the central terminal and the left and right terminals respective capacities are generated. With such terminal arrangement, when such a capacitor is installed on a printed circuit board, for example, so-called reverse installation, wherein the orientation of the capacitor is reversed with respect to the predetermined orientation, which results in reversal of polarity of charge voltage, may not be caused. Therefore, such terminal arrangement is quite useful for the case of polarized capacitor, such as a solid state electrolytic capacitor.

Hereinafter, discussion will be given for the construction of the conventional three-terminal capacitor. FIG. 1 shows an external view of an example of a cylindrical capacitor element, for which a process of production of the conventional three-terminal capacitor has been disclosed in Japanese Unexamined Patent Publication (Kokai) No. Showa 62-150816 (Patent Application No. Showa 60-294362) is applied. Hereinafter, the three-terminal capacitor fabricated through this process will be referred to as a capacitor of the prior art 1. It should be noted that FIG. 1 is illustrated without the armor resin for simplification of the following discussion. Referring tso FIG. 1, the capacitor includes a lead terminal 2c bent into essentially into a channel-shaped configuration. A solid state electrolytic capacitor element 3 (hereinafter referred to as "capacitor element") formed of a valve function metal, such as tantalum and the like, is disposed between both leg portions of the lead terminal 2c. Both leg portions and upper bridging portion are fixedly bonded onto the side surface and upper surface of the capacitor element by a conductive bond 5. For a tantalum wire 4 extending vertically from the center of the lower surface of the capacitor element 3 perpendicular to the lower surface, a lead terminal 1 is welded. In the solid state electrolytic capacitor, the periphery of the capacitor element 3 normally becomes cathode the side, with lead terminals 2c serving as terminals, and the tantalum wire at the central portion of the lower end of the capacitor element 3 becomes the anode, with the lead terminal 1 becomes serving as an anode lead terminal.

In such a three-terminal capacitor, it is inherently required to connect at least one of the peripheral surfaces or upper and lower end surfaces to a cathode lead terminal 2c. However, in the capacitor of the prior art 1 set forth above, a problem is encountered in the reliability of connection between the capacitor element 3 and the cathode lead terminal 2c. Namely, when a vibration or an impact is applied to the capacitor element in the axial direction, the connecting portion of the capacitor element 3 and the cathode lead wire 2c can be peeled off.

In order to improve the reliability of connecting in the three-terminal capacitor, there has been proposed a capacitor (hereinafter referred to as "capacitor of the prior art 2") having the construction as illustrated in FIG. 2. It should be noted that the conductive bond for connecting the capacitor element 3 and the cathode lead terminal 2dL,2dR and the armor resin are neglected to maintaining the following discussion simple enough for facilitating understanding. Referring to FIG. 2, in the shown capacitor, the cathode lead terminal is separated into a lead terminal 2dL supporting the capacitor element 3 at the left side and a lead terminal 2dR opposing to the lead terminal 2dL and supporting the capacitor element at the right side. Each of the cathode lead terminals 2dL and 2dR includes an arc-shaped portion extending in an arc-shaped configuration along the circumferential surface of the capacitor element 3, and a straight portion extending perpendicularly (in the axial direction of the capacitor element 3) to the arc-shaped portion. With respect to this capacitor, considering the construction on the plane perpendicular to the anode lead terminal 1 and including the arc-shaped portions of the lead terminals 2dL and 2dR, the arc-shaped portion uniformly supports the capacitor element 3 in substantially all directions. Accordingly, even when a vibration or an impact is exerted on the capacitor from any horizontal (perpendicular to the axis of the capacitor element 3) direction, connection between the capacitor element 3 and the cathode lead terminals 2dL and 2dR may not be damaged.

As set forth above, the capacitor of the prior art 2 as illustrated in FIG. 2 has the advantage for higher reliability of connection between the capacitor element and the cathode lead terminal, in comparison with the capacitor of the prior art 1 illustrated in FIG. 1. However, it has the problem the increasing of production cost and, thus, of being expensive. The reason will be below.

FIGS. 3 to 6 show an external view of a production process of the capacitor of the prior art 2. First, a right cathode lead terminal 2dR is mounted on strip 5dR, and the anode lead terminal 1, connected to capacitor element 3, is mounted to strip 53. Then, positioning is performed as illustrated by the arrow of the broken line so that two strips 5dR and 53 are arranged in an overlapping manner. At this time, a distance $L_{dR}$ between the cathode lead terminal 2dR and the anode lead terminal 1 of the capacitor element 3 must be set to be greater than an original distance (namely, substantially equal to the radius of the capacitor element) at completion of production of the capacitor. It should be noted that, in the practical production process, while a plurality of cathode lead terminals 2dR and the capacitor elements 3 are mounted on the strip 5dR and the strip 53, only one of each is shown in FIG. 3 for simplification of the disclosure.

Next, as shown by the solid line arrow in FIG. 4, the overlapped strip 53 is shifted toward the right on the plane of FIG. 4 to engage the capacitor element 3 and the right side cathode lead terminal 2dR.

Subsequently, as shown in FIG. 5, the left side cathode lead terminal 2dL mounted only to the strip 5dL is prepared. Then, the strip 53 is positioned as shown by the broken line in FIG. 5. The strip 5dL is then overlapped to the strips 5dR and 53, which are already obtained through the process step of FIG. 4. At this time, a distance $L_{dL}$ between the cathode lead terminal 2dL and the anode lead terminal 1 of the capacitor element 3 is set to be greater than the original distance at completion of production.

Thereafter, as shown by the arrow in solid line, the strip 5dL is shifted toward the right in FIG. 6 to engage the cathode lead terminal 2dL to the capacitor element 3. Furthermore, the peripheral surfaces of the cathode lead terminals 2dR and 2dL and the capacitor element 3 are fixedly bonded by way of application of a conductive bond, dipped into molten solder liquid, and so forth.

Finally, by way of dipping method, the armor resin is applied. Thereafter, the lead terminals are cut off the strip to complete the capacitor of the prior 2 as illustrated in FIG. 2. It should be noted that, in FIG. 2, as set forth, the conductive bond and the armor resin have not been shown to simplify the disclosure.

As can be clear from the foregoing discussion of the production process, in the capacitor of the prior art 2, after overlapping the strips, the strips must be shifted twice. In contrast, the capacitor of the prior art 1, upon assembling the cathode lead terminal and the capacitor element, as disclosed in the publication, only requires placing the channel-shaped cathode lead terminal on the strip, on which the capacitor element is mounted an overlapping manner. The later method does not require lateral sliding of the strips.

Thus, in order to fabricate the capacitor of the prior art 2, after overlapping the strips, at least two extra steps are required for laterally shifting the strips to require higher production cost.

SUMMARY OF THE INVENTION

It is an object of the present invention to provide a three-terminal dip type capacitor which has high reliability at connection between the cathode lead terminals and the capacitor element comparable with the foregoing capacitor of the prior art 2, but which can be fabricated through fewer steps for holding down the production.

According to the present invention, the three-terminal dip type capacitor comprises a capacitor element having a pair of end faces and a side face between the end faces, having a first electrode extending from the center of one end face and a second electrode extending on the side face, with the first lead terminal arranged at the center portion of the end face of the capacitor element and in contact with the first electrode, and the pair of second and third lead terminals connected to the second electrode of the capacitor element. The second and third lead terminals respectively include contacting portions extending in a direction surrounding said side face of the capacitor element and contacting thereto an extracting portion extending from the one end of said contacting portion in parallel to said first lead terminal, the extracting portions of the first and second lead terminals and the first lead terminal being arranged in a line.

Normally, the contacting portion of the capacitor element and the second and third lead terminals are covered by a resin armor portion.

Also, the capacitor element may be cylindrical configuration and the contacting portions of the second and third lead terminals may be of arc-shaped configuration having substantially equal radius to the external diameter of the capacitor.

The second and third terminals may have holding portion extending from the arc-shaped contacting portion to the other end face of the capacitor element.

With the construction according to the present invention as set forth above, the three-terminal dip type capacitor can be assembled by shifting a strip provided with the capacitor element and the first lead terminal, a strip provided with the second lead terminal and a strip provided with the third lead terminal, in axial direction of the capacitor element. Therefore, the capacitor can be produced through lesser process steps and lesser production cost than the capacitor of the prior art 2 shown in FIG. 2. Also, in the present invention, the reliability of connection between two second and third lead terminals (cathode lead terminals) and the capacitor element can be maintained at comparable level to the capacitor of prior art 2.

BRIEF DESCRIPTION OF THE DRAWINGS

The present invention will be understood more fully from the detailed description given herebelow and from the accompanying drawings of the present invention, which, however, should not be taken to be limitative to the present invention, but are for explanation and understanding only.

In the drawings.

DETAILED DESCRIPTION OF THE PREFERRED EMBODIMENTS

Next, the preferred embodiment of a three-terminal dip type capacitor according to the present invention will be discussed with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the disclosure of the present invention.

Figure 7:
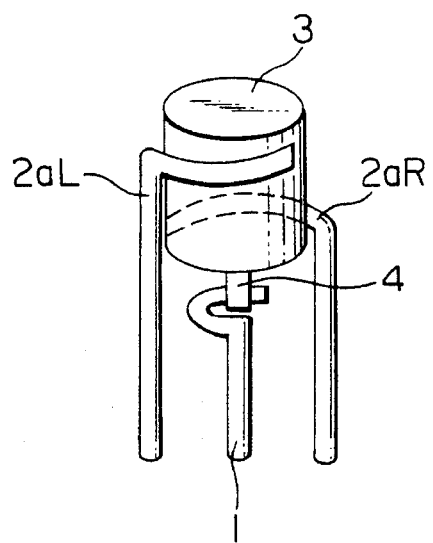
FIG. 7 is an illustration showing external appearance of the first embodiment of a dip type capacitor according to the present invention.

FIG. 7 is an illustration showing the first embodiment of a three-terminal capacitor according to the present invention. In FIG. 7, in order to clearly illustrate the present invention, i.e. the configuration of the cathode lead terminals 2aL and 2aR, the connecting members for connecting the cathode lead terminals 2aL and 2aR, the capacitor element 3 (for example, conductive bond, solder or so forth) and the armor resin are neglected from illustration. Referring to FIG. 7, the capacitor element of the shown embodiment is a straight cylindrical configuration. The tantalum wire 4 is vertically extended from the center of the lower end face of the capacitor element 3. To the tantalum wire 4, the anode lead terminal 1 is welded to form a conventionally known capacitor element with the anode lead terminal 1. The left side cathode lead terminal 2aL comprises an arc-shaped portion surrounding the circumferential half of the periphery of the upper portion (near the end face opposite to the end face where the anode lead terminal 1 is provided) of the capacitor element 3, and a straight portion extending from the arc-shaped portion in axial direction of the capacitor element. Similarly, the right side cathode lead terminal 2aR comprises an arc-shaped portion surrounding the circumferential half of the periphery of the lower portion of the capacitor element 3 and a straight portion extending from the arc-shaped portion in the axial direction of the capacitor element 3.

Figure 1:
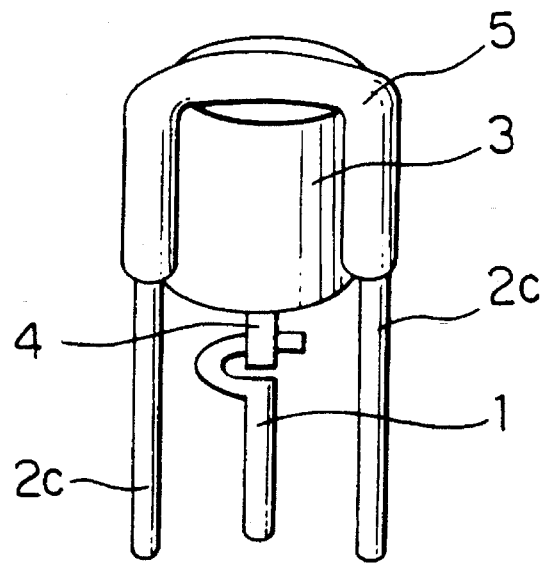
FIG. 1 is a perspective view showing the internal construction of the conventional dip type capacitor.
Figure 2:
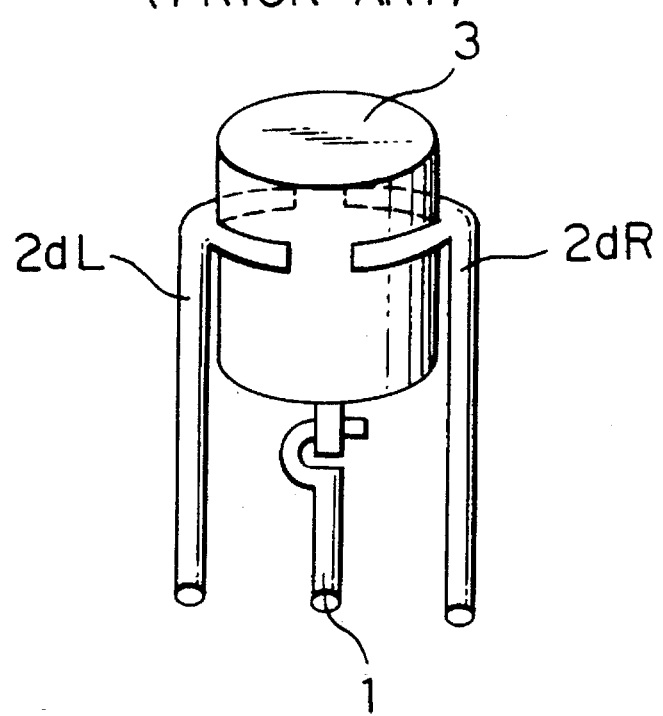
FIG. 2 is a perspective view showing the internal construction of the another conventional dip type capacitor.
Figure 3:
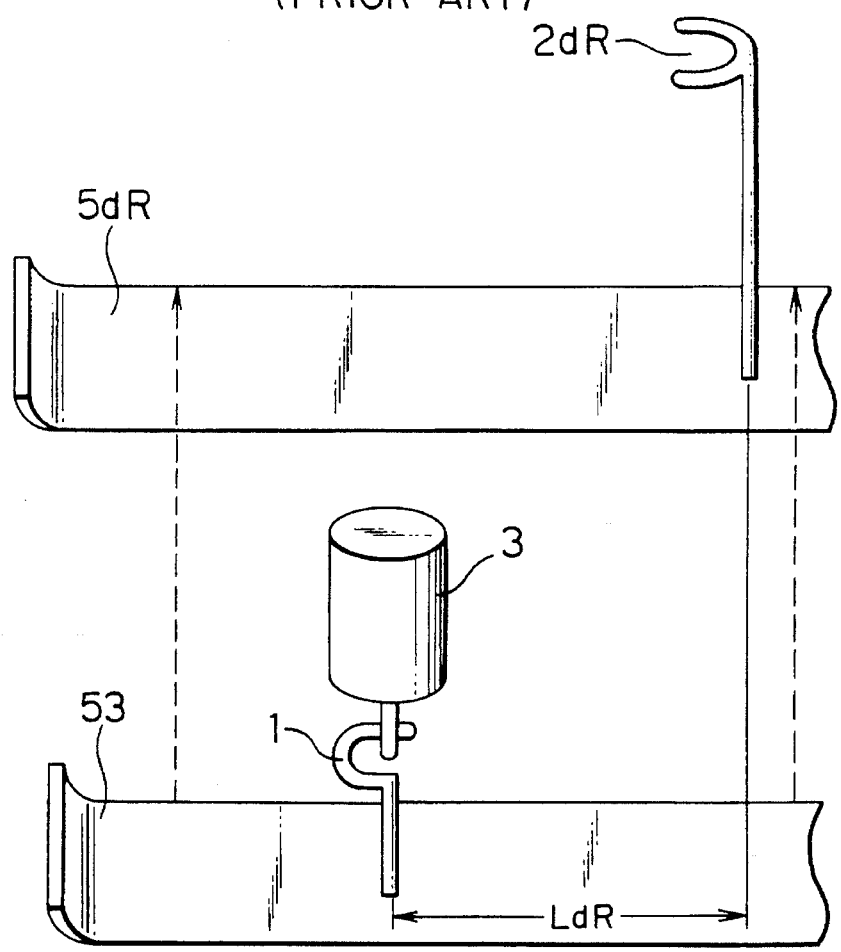
FIG. 3 is a perspective view showing a production process of the conventional dip type capacitor of FIG. 2.
Figure 4:
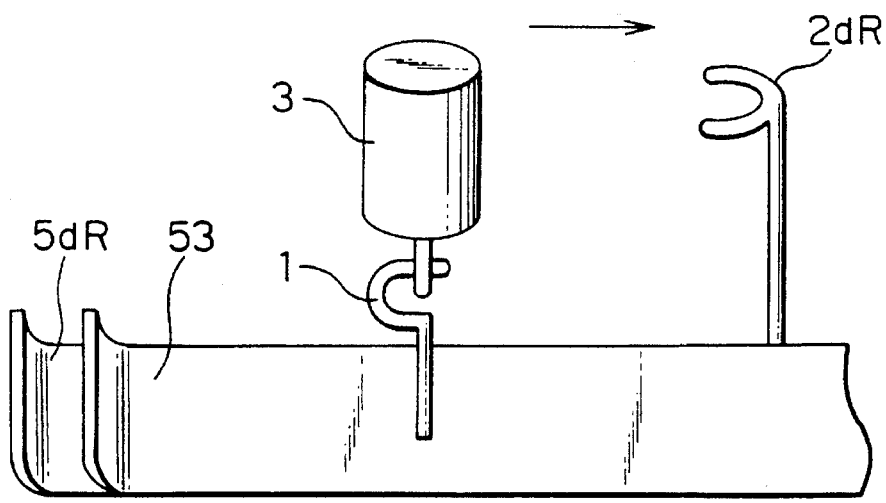
FIG. 4 is a perspective view showing a production process next to FIG. 3.
Figure 5:
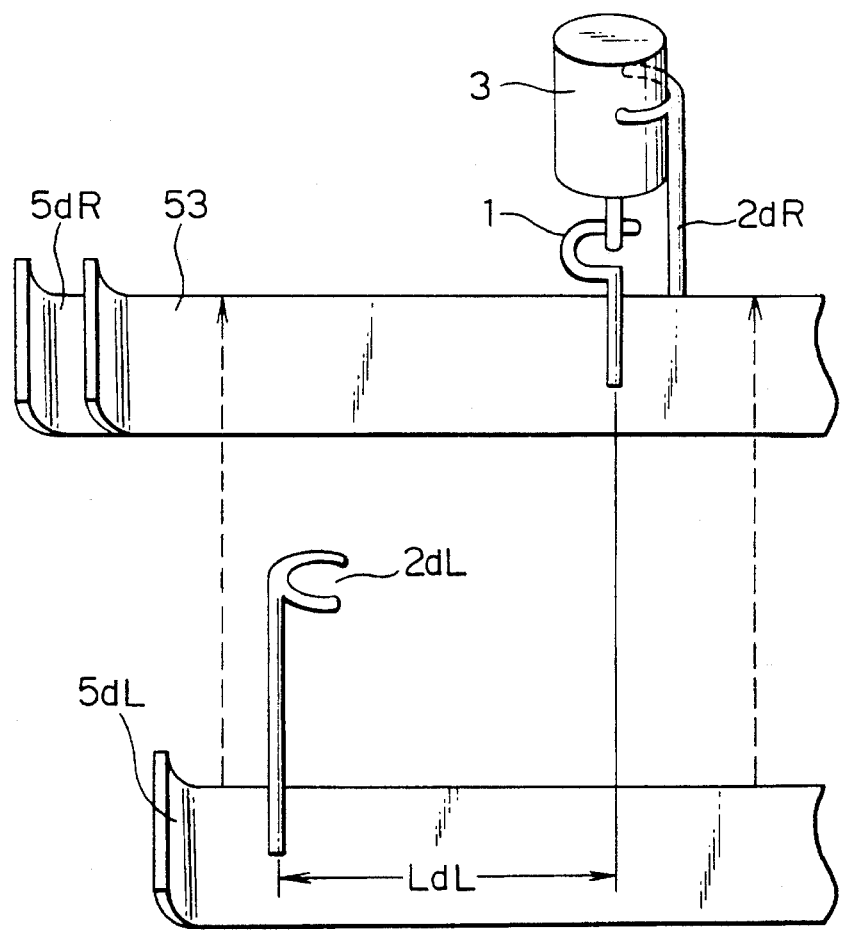
FIG. 5 is a perspective view showing a production process next to FIG. 4.
Figure 6:
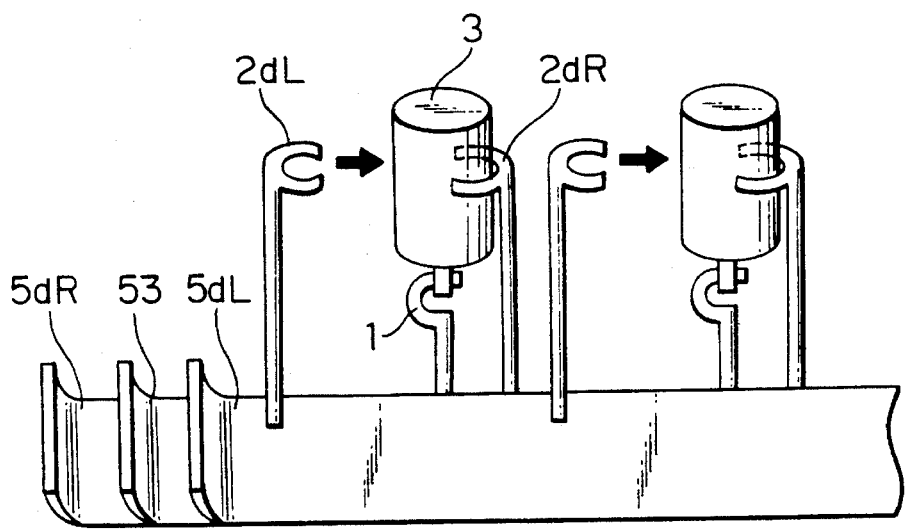
FIG. 6 is a perspective view showing a production process next to FIG. 5.

The feature of the shown embodiment is that, in each of the cathode lead terminals 2aL and 2aR, the straight portion is connected to one end of the arc-shaped portion instead of the circumferentially central portion. Namely, in the above-mentioned capacitor of the prior art 2 (see FIG. 2), the arc-shaped portion of the left side cathode lead terminal 2dL circumferentially surrounds the left side of the capacitor element 3, and the arc-shaped portion of the right side cathode lead terminal 2dR circumferentially surrounds the right side of the capacitor element 3, and the straight portions are extended from the center portion of these arc-shaped portions.

In contrast to this, in the shown embodiment (see FIG. 7), the arc-shaped portion of the left side cathode lead terminal 2aL extends from the upper end of the straight portion in counterclockwise direction along the periphery of the capacitor element to contact thereto. Accordingly, the straight portion is extended downwardly from one end (left end in FIG. 7) of the arc-shaped portion. On the other hand, the right side cathode lead terminal 2aR is arranged at a position where the straight portion thereof is located in opposition to the straight portion of the left side cathode lead terminal 2aL across the axial center of the capacitor element 3, and the arc-shaped portion thereof extends from the upper end of the straight portion in counterclockwise direction along the periphery of the capacitor element 3. Accordingly, the straight portion is extended downwardly from one end (right end in FIG. 7) of the arc-shaped portion.

In the shown embodiment, since the capacitor element 3 is surrounded by two semi-circular arc-shaped portions, the connecting portion between the capacitor element 3 and the cathode lead terminals 2aL and 2aR is not damaged when vibration and impact is horizontally (perpendicularly to the axial direction of the capacitor element 3) exerted from any direction.

Figure 8:
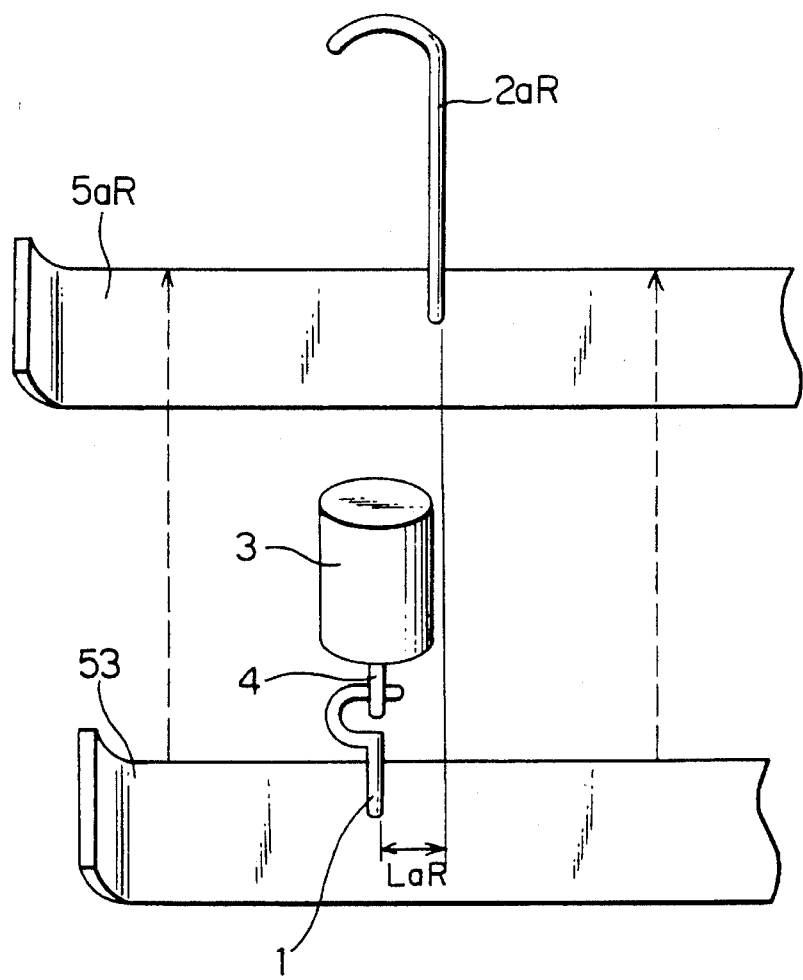
FIG. 8 is a perspective view showing a production process of the first embodiment of the dip type capacitor off FIG. 7.

Next, discussion will be given for the production process of the shown embodiment of the three-terminal capacitor. FIGS. 8 to 11 are illustrations showing the three-terminal capacitor production process in order of process steps. At first, as shown in FIG. 8, a strip 5aR mounting only right side cathode lead terminal 2aR and a strip 53 mounting the capacitor element 3 and the anode lead terminal 1 are prepared. As shown by the arrow in broken line in FIG. 8, two strips 5aR and 53 are overlapped to each other by positioning. At this time, the distance $L_{aR}$ between the cathode lead terminal 2aR and the anode lead terminal 1 of the capacitor element 3 is set at an original distance (i.e. substantially equal to the radius of the capacitor element 3) upon completion of production of the capacitor. It should be noted that while a plurality of cathode lead terminals and the capacitor elements 3 are mounted on the strips 5aR and 53 in the practical production process, FIG. 8 shows only one of each element for simplification of the illustration.

Figure 9:
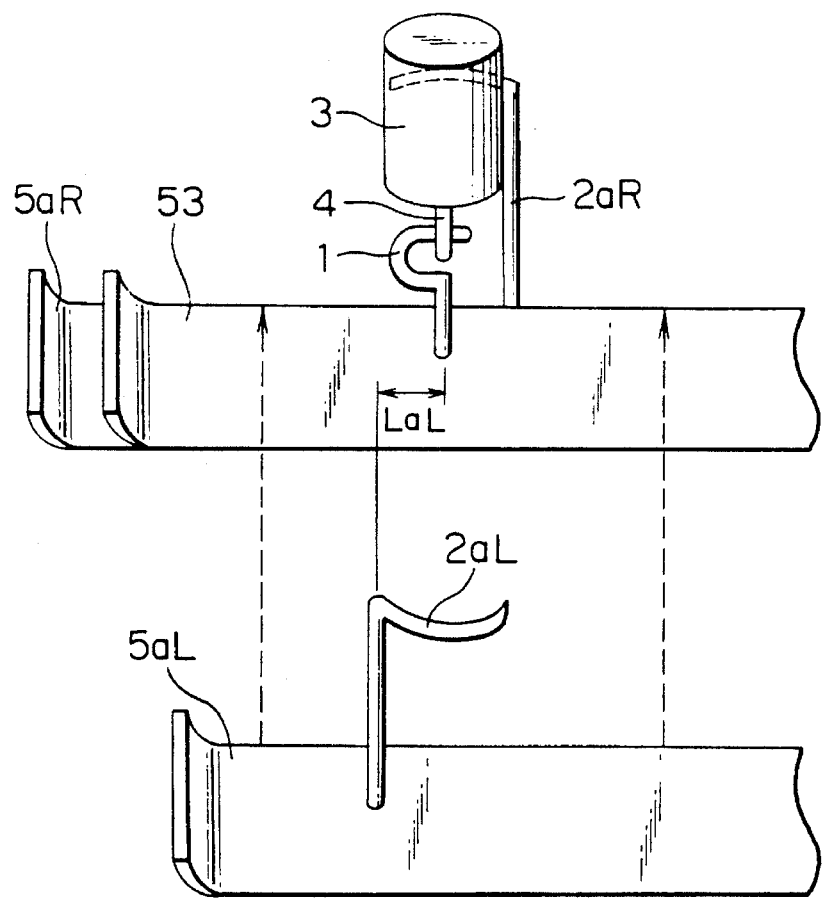
FIG. 9 is a perspective view showing a production process next to FIG. 8.

Next, as shown in FIG. 9, the strip 5aL mounting only the left cathode lead terminal 2aL is prepared. The strip 5aL is positioned as shown by the arrow of the broken line shown in FIG. 9. Then, the strip 5aL is overlapped to the strips 5aR and 53. At this time, the distance $L_{aL}$ between the cathode lead terminal 2aL and the anode lead terminal 1 is set to be substantially equal to the original size after completion of production of the capacitor.

Figure 10:
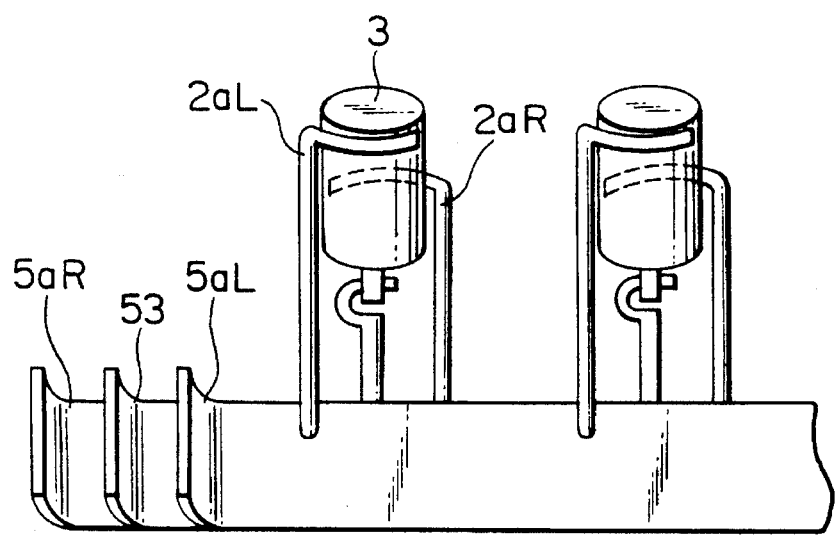
FIG. 10 is a perspective view showing a production process next to FIG. 9.
Figure 11:
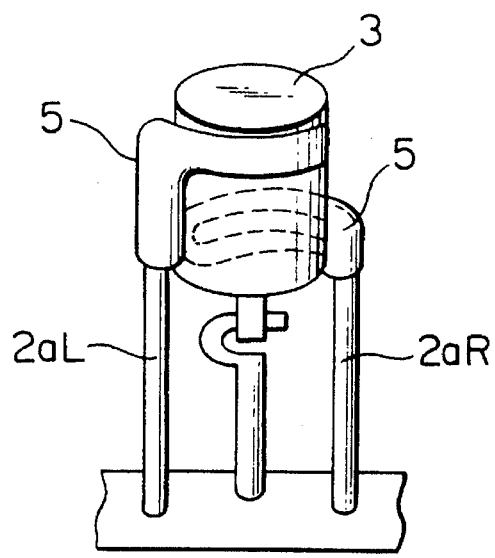
FIG. 11 is a perspective view showing a production process next to FIG. 10.
Figure 12:
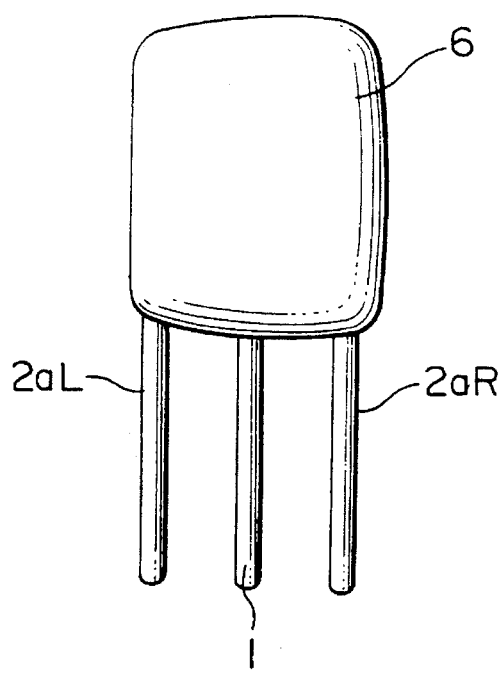
FIG. 12 is an illustration showing a dip type capacitor completed by providing an armor resin.

Thus, as shown in FIG. 10, the assembly, in which the cathode lead terminals 2aL and 2aR and the capacitor elements 3 are engaged can be obtained. Thereafter, as shown in FIG. 11, by known method and known material, such as the conductive bond, solder and so forth, the cathode lead terminals 2aL and 2aR are fixedly bonded to the capacitor element 3. Thereafter, the armor resin is formed by a dipping method. Subsequently, the lead terminals are cut to complete the production of the three-terminal capacitor having an external appearance illustrated on FIG. 12. In the shown embodiment thus obtained, the external appearance neglecting the bonding member between the capacitor element 3 and the cathode lead terminals 2aL and 2aR and the armor resin is shown in FIG. 7.

As demonstrated above, in the shown embodiment, while there are two steps for overlapping the strips, these steps do not require laterally shifting the strips. Namely, in comparison with the production process of the capacitor of the prior art 2, at least two strip shifting steps become unnecessary to permit reduction of the production cost.

It should be noted that though these cathode lead terminals 2aL and 2aR employed in the shown embodiment may be metals having high rigidity, resilient wire, such as nickel base solder plated wire (known as NPA), iron base copper undercoat solder plated wire (known as CPA) and so forth, which are typically employed in the tantalum solid state electrolytic capacitor, for example, can also be employed. By employing such resilient wire, even when the dimension and configuration of the cathode lead terminal and the capacitor element (for example, the radius of curvature of the arc-shaped portion or mounting position to the strip) are different from the designed value, such tolerance can be accommodated by the resilient characteristics of the lead terminal. Therefore, it becomes possible to produce the three-terminal capacitor even when the dimensional accuracy of the member and precision in assembling are not so high.

Figure 13:
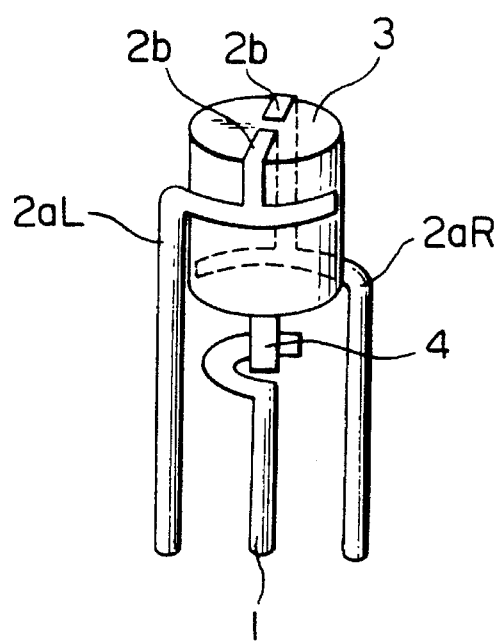
FIG. 13 is an illustration showing external appearance of the second embodiment of a dip type capacitor according to the present invention.

Next, discussion will be given for the second embodiment of the three-terminal dip type capacitor. FIG. 13 shows the external appearance of the second embodiment of the three-terminal capacitor according to the present invention. It should be noted that FIG. 13 is illustrated neglecting the connecting member connecting the cathode lead terminals 2aL and 2aR and the capacitor element 3 and the armor resin, for simplification of illustration. Referring to FIG. 13, the cathode lead terminals 2aL and 2aR of the shown embodiment is differentiated from that of the first embodiment in construction. Namely, for respective cathode lead terminals 2aL and 2aR, end face supporting portions 2b mating with the upper end face of the capacitor element 3 are provided. These end face supporting portions 2b comprise a vertical extending portion provided at the center portion of the arc-shaped portions of the cathode lead terminals 2aL and 2aR (namely at the position circumferentially shifted from the joining portion between the straight portion and the arc-shaped portion in the extent of substantially 90°) and extending upwardly and a horizontally extending portion bent at right angle from the vertically extending portion and extending along the upper end face of the capacitor element 3. By this construction, the capacitor element 3 can be held from the upper face to the lower portion (extending direction of the anode lead terminal 1). Therefore, the shown embodiment of the three terminal capacitor may not cause pealing off at the connecting portion between the cathode lead terminal and the capacitor element even when vibration and impact is exerted not only in the horizontal direction (direction perpendicular to the axis of the capacitor) but also in vertical direction (direction parallel to the axis of the capacitor), to achieve high reliability in connection.

The circumferential position of the end face supporting portion 2b is not specified to the center of the arc-shaped portion, but can be at any angular positions, such as 45° or 180° from the joining portion between the straight portion and the arc-shaped portion. Also, while the shown embodiment is illustrated to have single end face supporting portion 2b of the wire in the cathode lead terminal, the number of the end face supporting portion should not be limited to be one but can be a plural. Furthermore, the configuration of the end face supporting member can be any appropriate configuration, such as wider width strip, cap-shape strip, etc. Furthermore, it is possible to provide the end face supporting portion in one of two cathode lead terminals.

It should be noted while the capacitor elements 3 in all embodiments are illustrated in a cylindrical configuration, the present invention is applicable to capacitors having variety of configurations of capacitor elements, such as prismatic configuration or so forth with equally maintaining the function and effect of the present invention. In such case, the arc-shaped portion of the cathode lead terminal has to be modified into polygonal configuration adapting to the configuration of the capacitor element 3, with an opening portion for accommodating the capacitor element 3 to achieve the equivalent effect to the foregoing embodiments.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A three-terminal dip type capacitor comprising:
   a capacitor element of a cylindrical configuration having a pair of end faces and a side face between said end faces, wherein a first electrode extends from the center of one of said end faces and a second electrode extends from said side face;
   a first lead terminal arranged at the center portion of said end face of said capacitor element and in contact with said first electrode; and
   a pair of second and third lead terminals connected to said second electrode of said capacitor element, said second and third lead terminals respectively including arc-shaped contacting portions extending in a direction surrounding said side face of said capacitor element and contacting thereto, and an extracting portion extending from a first end of said contacting portion being in parallel to said first and second lead terminals and being extended in the same direction as said first lead terminal;
   said second and third terminals having a holding portion extending from the arc-shaped contacting portion to the other end face of said capacitor element.

2. A three-terminal dip type capacitor comprising:
   a capacitor element having a first end face and a second end face, said capacitor element having a first electrode extending from a center region of said first end face;
   said capacitor element further having a side region connecting said first end face and said second end face, said capacitor element also having a second electrode extending from said side region;
   a first lead terminal arranged at the center portion of said first end face of said capacitor element, said first lead terminal being in contact with said first electrode;
   a second and a third lead terminal, each respectively in contact with said second electrode, with each of said second and said third lead terminals comprising:
   an extracting portion parallel in orientation to said first lead terminal;
   a contacting portion connected to said extracting portion, said contacting portion extending away from said extracting portion in a single direction;
   said second and said third lead terminals being oriented such that said capacitor element is located between said second and said third lead terminals,
   wherein said capacitor element is of a cylindrical configuration and said contacting portions of said second and third lead terminals are each of an arc-shaped configuration having radius substantially equal to an external radius of said capacitor element.

3. A three-terminal dip-type capacitor as set forth in claim 2, further comprising a resin armor portion covering said capacitor element and said contacting portion of said second and third lead terminals.

4. A three-terminal dip type capacitor as set forth in claim 2, wherein said second and third terminals each have a holding portion extending from said arc-shaped contacting portion to said second end face of said capacitor element.

5. A three-terminal dip type capacitor as set forth in claim 2, wherein said second and third terminals are made of a metal or an alloy.

6. A three-terminal dip type capacitor as set forth in claim 2, wherein said second and third terminals are formed by one of a nickel base solder plated wire and an iron base copper undercoat solder plated wire.

* * * * *